United States Patent [19]

Norjiri et al.

[11] Patent Number: 5,232,542
[45] Date of Patent: Aug. 3, 1993

[54] DRUM FOR ASSEMBLING TIRE COMPONENTS

[75] Inventors: Yasushi Norjiri, Kobe; Takaaki Okuda, Shirakawa, both of Japan

[73] Assignee: Summitomo Rubber Industries, Ltd., Kobe, Japan

[21] Appl. No.: 620,010

[22] Filed: Nov. 30, 1990

[30] Foreign Application Priority Data

Dec. 4, 1989 [JP] Japan .................. 1-315555

[51] Int. Cl.5 .............. B29C 41/02; B29D 30/24
[52] U.S. Cl. ...................... 156/417; 156/419
[58] Field of Search ........... 156/417, 415, 420, 406.6, 156/413, 414, 419

[56] References Cited

U.S. PATENT DOCUMENTS

| | | | |
|---|---|---|---|
| 2,980,160 | 4/1961 | Deibel | 156/415 |
| 3,085,763 | 4/1963 | Floyd | 279/2 R |
| 3,121,652 | 2/1964 | Borglin et al. | 156/417 |
| 3,178,331 | 4/1985 | Bishop et al. | 156/415 |
| 3,207,648 | 9/1965 | Shilts | 156/145 |
| 3,418,192 | 12/1968 | Nädler | 156/417 |
| 3,873,398 | 3/1975 | Yokoo et al. | 156/417 |
| 3,929,546 | 12/1975 | Katagiri et al. | 156/417 |
| 4,155,796 | 5/1979 | Rambacher | 156/415 |
| 4,773,656 | 9/1988 | Chlupsa | 279/2 R |

FOREIGN PATENT DOCUMENTS

50-31910 10/1975 Japan .
56-162631 12/1981 Japan .
60-68929 4/1985 Japan .

Primary Examiner—Jay H. Woo
Assistant Examiner—Robert B. Davis

[57] ABSTRACT

A drum for assembling tire components comprising a sliding body externally mounted on and engaged with a shaft so that it may move in an axial direction, and a cylindrical aggregate of circumferentially spaced apart segments externally mounted on the sliding body by an expander means so that the outer diameter of said cylindrical aggregate of segments is expandable and reducible by means of the backward and forward movement in the axial direction of the sliding body by a cylinder mechanism provided outside the sliding body. The expander means comprises tapered surfaces on the outside of the sliding body and the inside of each segment and an axially displaced annular piston and cylinder tube is operatively connected to the sliding body by means of connecting members.

8 Claims, 6 Drawing Sheets

DRUM FOR ASSEMBLING TIRE COMPONENTS

BACKGROUND OF THE INVENTION

The present invention relates to a drum for assembling tire components such as a breaker with a tread (in this use the drum is generally called a belt drum).

In general, a belt drum is a means used for building a belt and tread assembly as a sub-assembled tire component. The assembly is then removed from the belt drum held by a transfer ring, transferred to a shaping drum or the like, and assembled onto a toroidally shaped carcass to build a complete green tire for subsequent vulcanisation.

Figure 6:
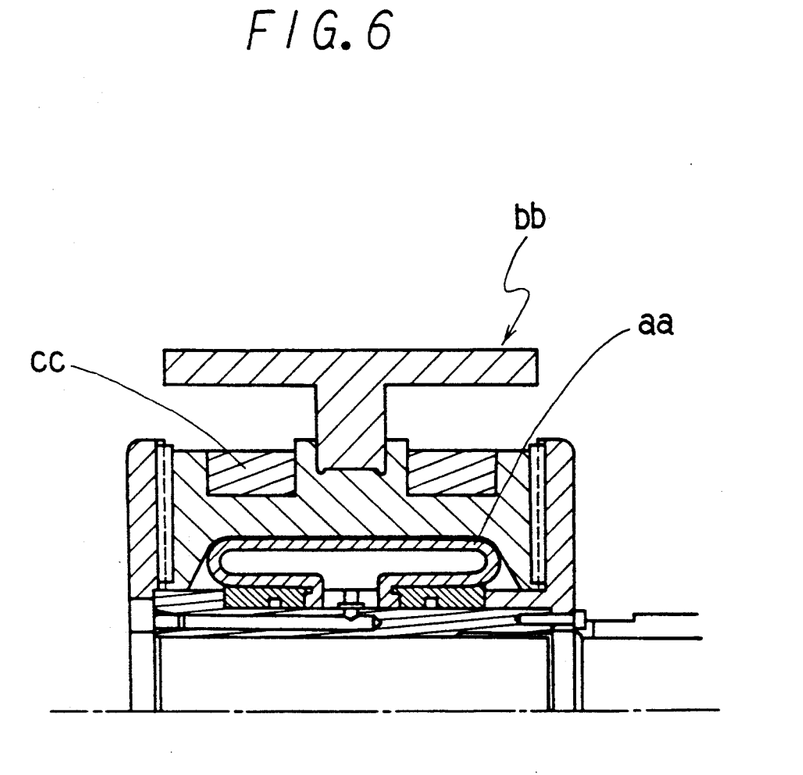
FIG. 6 is a cross sectional view showing an example of a conventional drum.

In order to facilitate the building on the belt drum and the removal from the belt drum of the assembly, the belt drum must be capable of increasing and reducing its outer diameter. An example of a conventional mechanism for this increase and decrease of the belt drum diameter is the air bag type mechanism shown in FIG. 6. In this case, compressed air is supplied to an expandable air bag to inflate it to displace movable drum segments bb in the radially outward direction. Reference element cc represents a rubber band for reducing the expanded outer diameter of the drum. The conventional air bag type mechanism has drawbacks in that the expandable stroke of the drum is short and the drum is insufficiently resistant to an external pressure.

Another example of a conventional mechanism for increasing and decreasing the drum diameter is a tube type mechanism (not represented in the drawings). However, this tube type mechanism has the same drawbacks as the air bag type mechanism.

Yet another known and conventional drum employs a link mechanism to provide the expanding and reducing mechanism. However, this drum has a drawback in that the resistive strength to external pressure is insufficient when the link is inclined relative to the direction of the external pressure though the strength is sufficient when the link is later positioned parallel to the direction of the external pressure.

In view of the foregoing, it is an object of the present invention to provide a drum for assembling tire components such as a breaker with a tread, which has a simple construction capable of providing a reliable expansion and shrinkage, has a sufficient structural stability to minimise any undesired movements of respective drum segments and has a much increased expandable stroke in the radial direction.

SUMMARY OF THE INVENTION

Accordingly, the present invention provides a drum for assembling tire components comprising a sliding body externally mounted on and engaged with a shaft so that it may move in an axial direction, and a cylindrical aggregate of circumferentially spaced apart segments externally mounted on the sliding body by an expander means so that the outer diameter of said cylindrical aggregate of segments is expandable and reducable by means of the backward and forward movement in the axial direction of the sliding body by a cylinder mechanism provided outside the sliding body.

Preferably, the expander means comprises a tapered surface on the outside of the sliding body, a co-operating internal tapered surface on each segment such that axial movement of the sliding body relative to the segments move the segments radially outwards. Two or more sets of co-operating tapered surfaces are preferably used.

Each segment may comprise an outer plate-like segment and an integral internal member which has formed on the outer surface one or more circumferentially extending grooves to locate an elastic ring fitted around the assembly of segments to provide radially inward return movement.

The cylinder mechanism is preferably axially spaced from the slider and comprises a ring-shaped piston fixed to the shaft and an axially movable cylinder tube operated by fluid pressure. The cylinder tube may be connected by a series of connecting members extending in the axial direction to the sliding member and adjustable stop means may be attached to the connecting members to allow setting of the diametral change.

When the cylinder tube of the cylinder mechanism moves relative to the shaft back and forth in the axial direction, the sliding body connected to the cylinder tube by the connecting member is forced to move back and forth in the axial direction. This movement of the sliding body causes the radial displacement of each segment and the outer diameter of the cylindrical aggregate thus can be increased or decreased. With respect to the reduction of the outer diameter, it may be achieved with the assistance of the restoring force of an elastic restoring means such as a rubber band or the like mounted on and engaged with the segments.

Since the number of the tapered surfaces of the sliding body is at least two, each segment is supported at two or more regions.

The sliding body and the cylinder mechanism are respectively arranged at different locations so that the outer diameter of the sliding body can be made small thereby the building of small size breaker/tread assembly becomes possible and also the inner diameter of the sliding body can be made large so that the diameter of the shaft which the drum mounts on can be made large toward enhancing mechanical accuracy and rigidity.

BRIEF DESCRIPTION OF THE DRAWINGS

The present invention will be explained below with reference to the attached drawings showing an embodiment in which.

DETAILED DESCRIPTION

Figure 1:
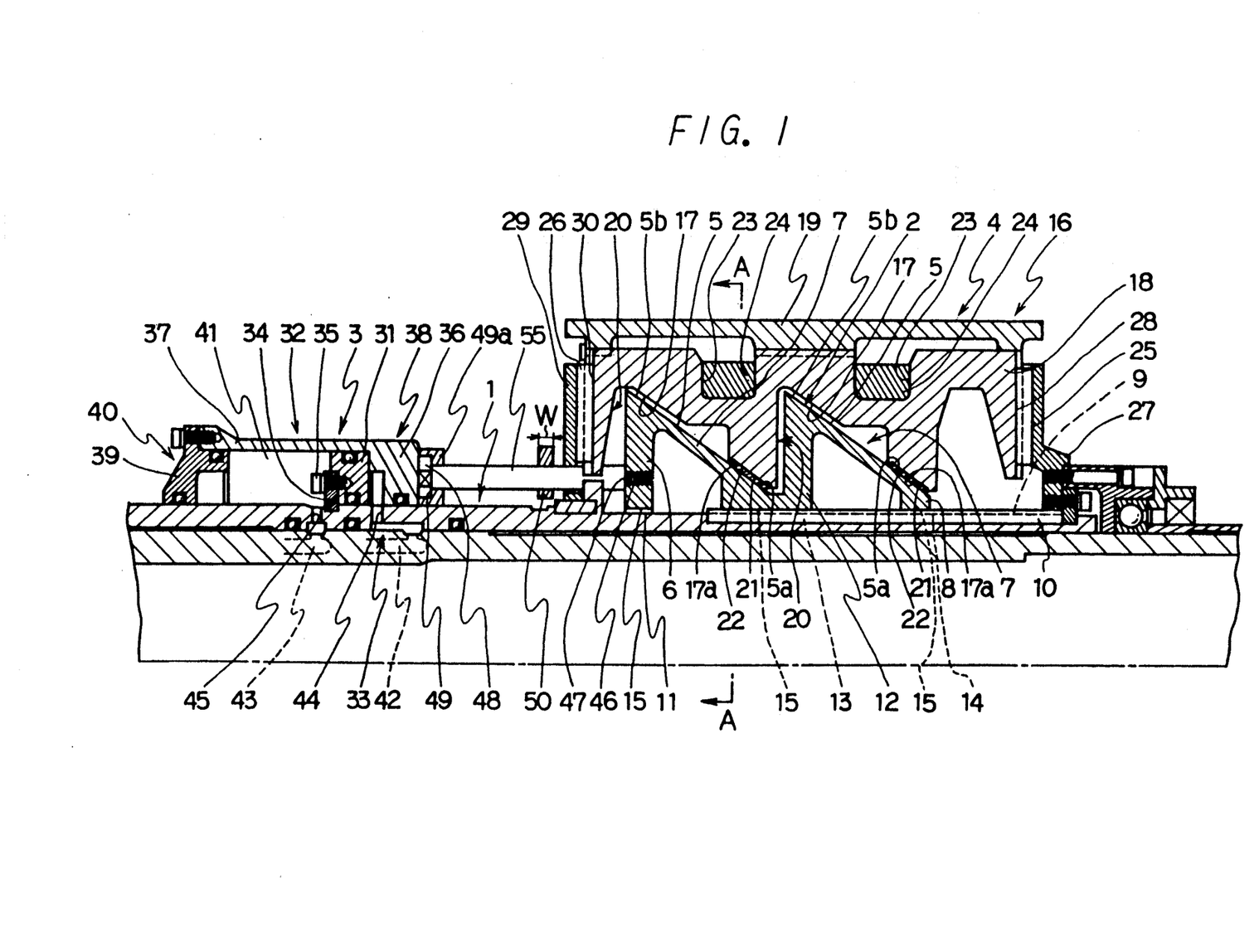
FIG. 1 is side sectional view showing a drum in the condition where the outer diameter is a minimum.

In FIG. 1, a drum for assembling a breaker with a tread comprises a sliding body 2 externally mounted on and engaged with a shaft 1 so that the body 2 is freely slidable in the axial direction. A cylinder mechanism 3, by means of which the sliding body 2 is moved back and forth in the axial direction, is provided on the shaft 1. A cylindrical assembly 4 of adjacent members, which will be referred to as a cylindrical aggregate 4, is mounted around the sliding body 2. Axial movement of the sliding body 2 by the cylinder mechanism 3 causes an increase or decrease of the outer diameter of the cylindrical aggregate 4 as will be described later.

The sliding body 2 is a tubular member having an outside circumferential surface shaped into two or more receiving areas to contact components of the cylindrical aggregate 4. The receiving portions comprise two cylindrical tapered surfaces 5 inclined in the same direction.

The sliding body 2 also comprises a rear wall 6 having a centre bore for the shaft 1, two tapered wall members 7 each providing one tapered surface 5 and a front wall 8 having a centre bore for the shaft.

On the outside circumferential surface of the shaft 1, an axially extending key 10 having a longitudinal concave channel 9 is fixed by means of fixing means such as bolts or the like (not illustrated in the drawings). Corresponding respective engaging portions 15 are formed on an internal circumferential surface 11 of the rear wall 6 of the sliding body 2, on an internal circumferential surface 13 of a neck 12 of the tapered wall of the sliding body 2 and on an internal circumferential surface 14 of the front wall 8 of the sliding body. Each is slidably received and located in the concave channel 9. Thus, the sliding body 2 moves back and forth in the axial direction guided by the key 10 and circumferentially located on the shaft 1.

The cylindrical aggregate 4 is formed by a plurality of plate-like segments 16 arranged circumferentially of the drum at prespecified angular intervals. Each segment 16 is radially displaced by the axial back and forth movement of the sliding body 2.

Each segment 16 comprises an internal member 18 and an external member 19 fixed to the internal member 18 by fixing means, such as bolts or the like (not illustrated in the drawings). The internal member 18 has a radially inside shape comprising concave contours 20 each including an inclined surface 17. This inclined surface 17 corresponds to the slope of the adjacent tapered surface 5 of the sliding body 2. Bearings or bushes 21 are fixed to the inner end part 17a, of each inclined contour 17 to provide the tapered internal surface portion 22. The tapered internal surface portions 22 are in contact with the tapered surfaces 5 of the sliding body 2. Thus, the segments 16 can be radially displaced by the sliding body 2 moving back and forth in the axial direction due to the bushes 21 sliding on the tapered surfaces 5. In the outside circumferential surface of the internal member 18 of each segment 16, circumferentially extending concave grooves 23 are formed so that rubber bands 24 can be provided in the grooves 23. Thus, each segment 16 is always biased inwardly by the elastic restoring force of the rubber bands 24. There are thirty-six segments 16 arranged at angular intervals around the circumferential direction but in each particular case an appropriate number may be chosen to give an effective drum.

Each segment 16 moves radially guided by guides 25, 26. The guides 25, 26 extend radially and are rods fixed to the shaft 1 in a form of an integrated assembly with an attachment part 27. The guide 25 is fixed to the attachment part 27 and slidably engaged in a radially extending channel 28 arranged at the end face of the internal member 18. The attachment part 27 is rigidly fixed to the shaft 1. The guide 26 comprises a rod attached to the shaft 1 via an attaching part 29. The guide 26 is fixed to the attaching part 29 and slidably engaged in a radially extending channel 30 arranged at the rear end face of the internal member 18. Due to the above-mentioned construction, each segment 16 can move radially, but is accurately located.

The cylinder mechanism 3 comprises an annular fixed piston 31 fixed to the shaft 1 and a movable cylinder tube 32 housing a piston 31. The cylinder tube 32 is moved back and forth in the axial direction by the application of pressurised fluid through a fluid supply and discharge means 33 (i.e. fluid parts 42, 43 and connecting passages 44, 45). The operating fluid may be air.

The piston 31 is ring-shaped around the shaft 1 and located at a distance from the sliding body 2. The piston 31 is fixed by a bolt 35 to a stop 34 which is fixed to the shaft 1. The cylinder tube 32 is composed of a first member 38 and a second member 40, where the first member 38 forms a front wall 36 and an external circumferential wall 37, and the second member 40 forms a rear portion 39. Accordingly, there is formed an annular cylinder chamber 41 between the outside circumferential surface of the shaft 1 and the inside circumferential surface of the cylinder tube 32. Connecting passages 44, 45 are provided before and behind the piston 31 in order to connect fluid ports 42, 43 of the fluid supply and discharge means 33 to the cylinder chamber 41.

Figure 2:
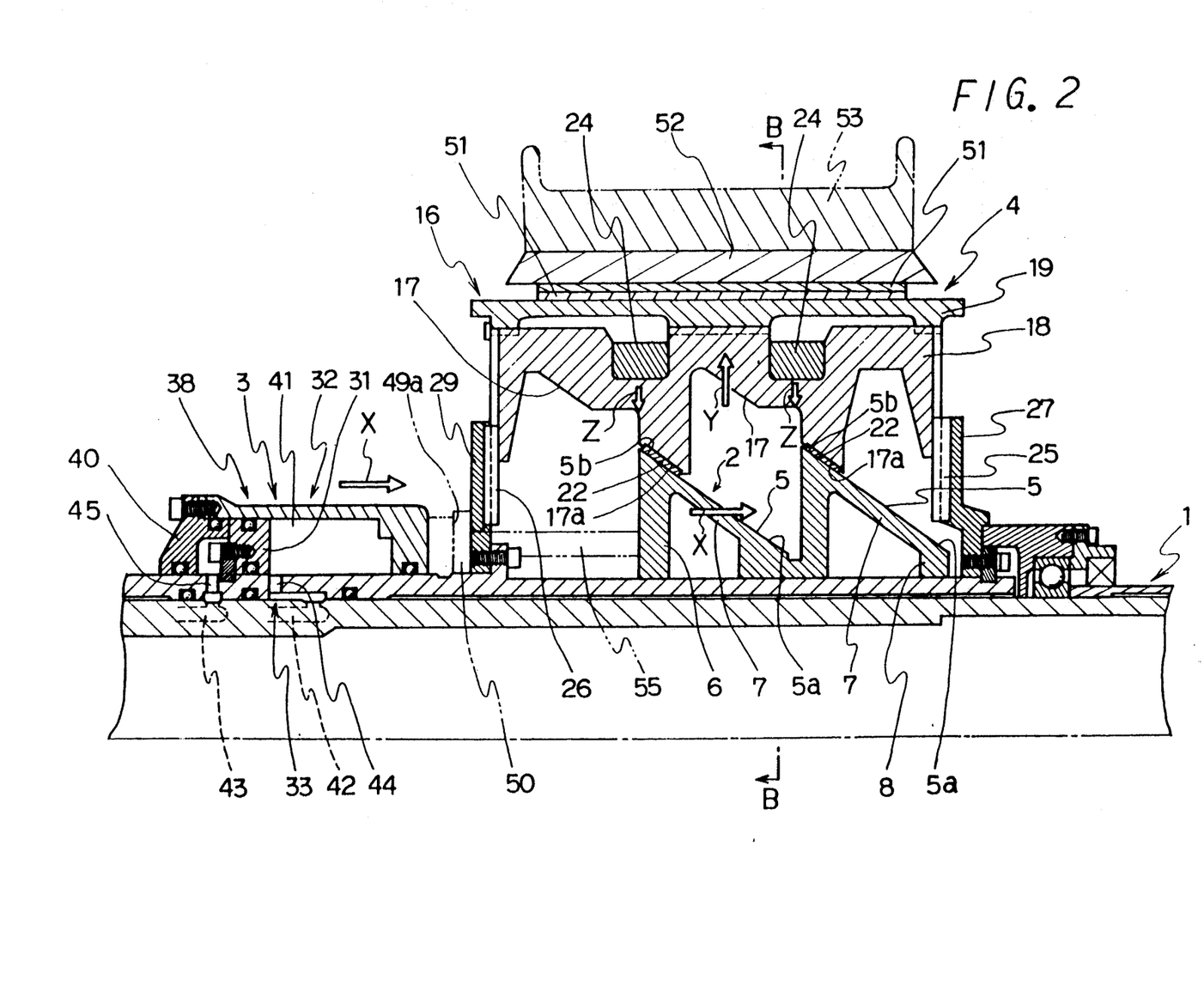
FIG. 2 is side sectional view showing the drum expanded.

When pressurised fluid is supplied into the cylinder chamber 41 through the fluid port 42 and the connecting passage 44, the cylinder tube 32 slides forward as shown by arrow X in FIG. 2. Conversely, when fluid pressure is supplied into the cylinder chamber 41 through the fluid port 43 and the connecting passage 45, the cylinder tube 32 slides backwards from the condition shown in FIG. 2. Note that when fluid is supplied into the cylinder chamber 41 through the fluid port 42, it is necessary to discharge the fluid in the cylinder chamber 41 through the fluid port 43, and conversely when fluid is supplied into the cylinder chamber 41 through the fluid port 43, it is necessary to discharge fluid from the cylinder chamber 41 through the fluid port 42.

The cylinder tube 32 of the cylinder mechanism 3 and the sliding body 2 are connected together by a set of connecting members 55. Each connecting member 55 has a threaded part 46 on the outer surface near the front end, engaged with a tapped hole 47 provided in the rear wall 6 of the sliding body 2 so that the connecting member 55 is connected to the sliding body 2. Further, the connecting member 55 has a flange 48 at its rear end, and the flange 48 is located in a container chamber 49 arranged on the front wall 36 of the cylinder tube 32 so that the connecting member 55 is connected to the cylinder tube 32.

A spacer 50, having a predetermined width W, is externally mounted on the connecting member 55 being allowed to freely move back and forth relative to the connecting member 55 in the axial direction. This stop (spacer) 50 restricts the sliding movement distance of the cylinder tube 32 in the direction shown by the arrow X (refer to FIG. 2). This restriction of the sliding movement distance causes a restriction in the radial movement length of the segments 16. In detail, the stop 50 is pinched between the front face 49a of the container chamber 49 and the rear face of the attaching part 29, and consequently the sliding movement distance of the cylinder tube 32 in the direction shown by the arrow X in FIG. 2 is controlled by the spacer.

Several connecting members 55 are arranged around the shaft 1 at a predetermined angular spacing in the circumferential direction. The attaching parts 27 and 29 are arranged at appropriate angular positions corresponding to the respective segments.

Figure 3:
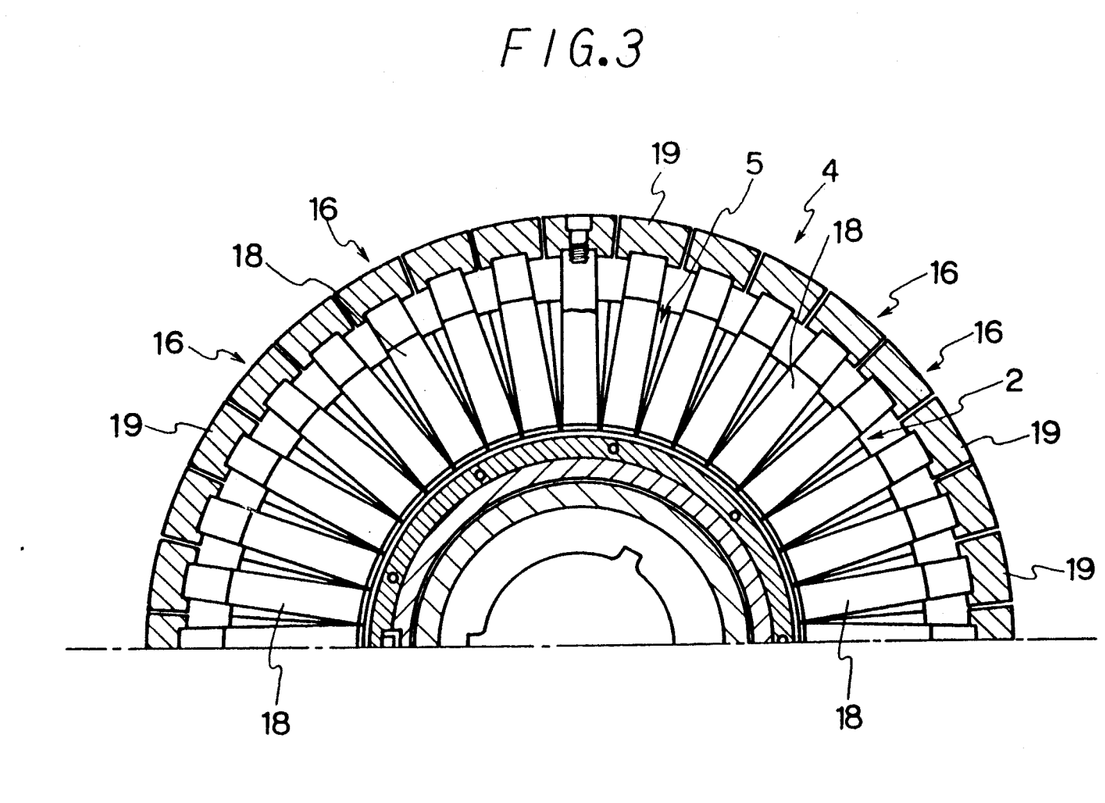
FIG. 3 is front sectional view taken along the line A—A in FIG. 1.
Figure 4:
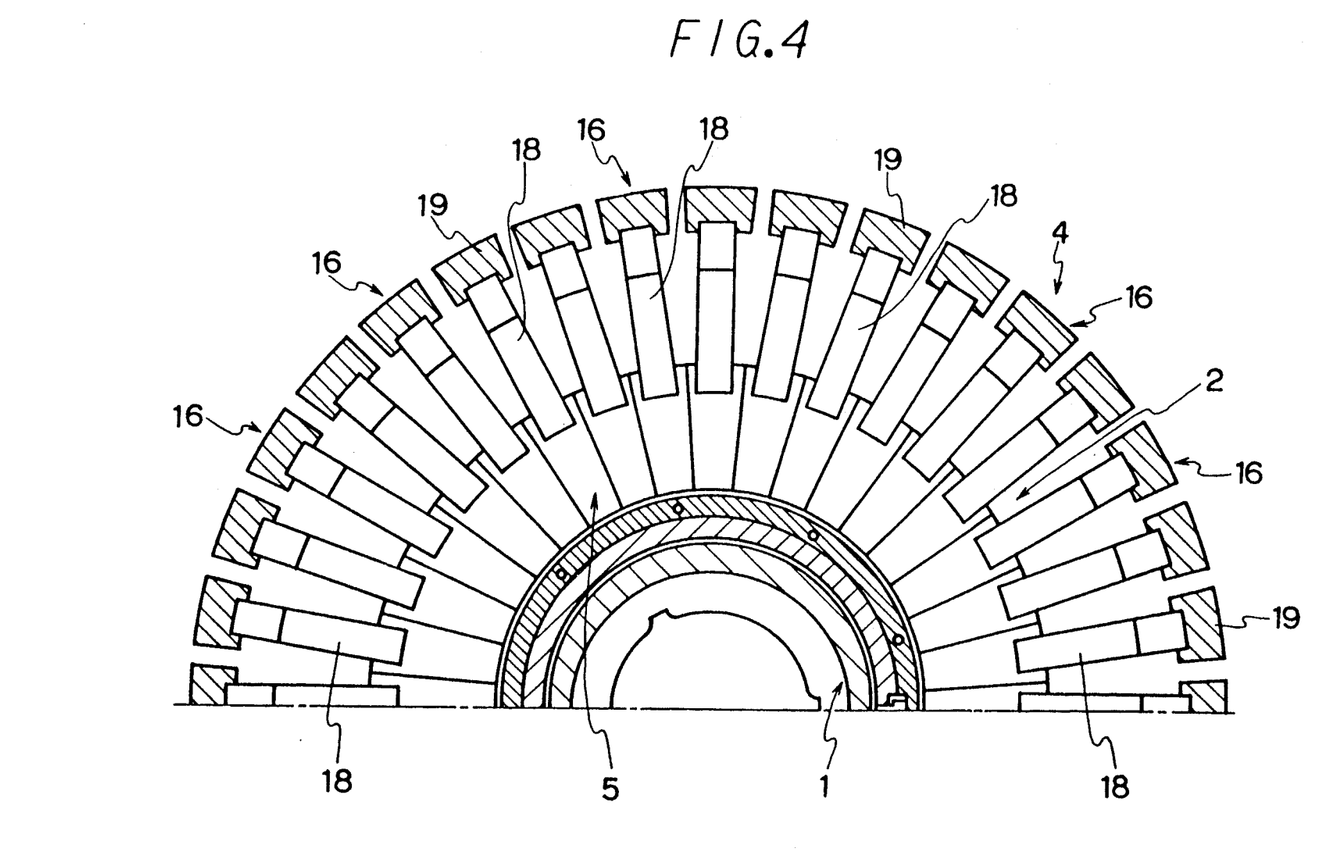
FIG. 4 is front sectional view taken along the line B—B in FIG. 2.
Figure 5:
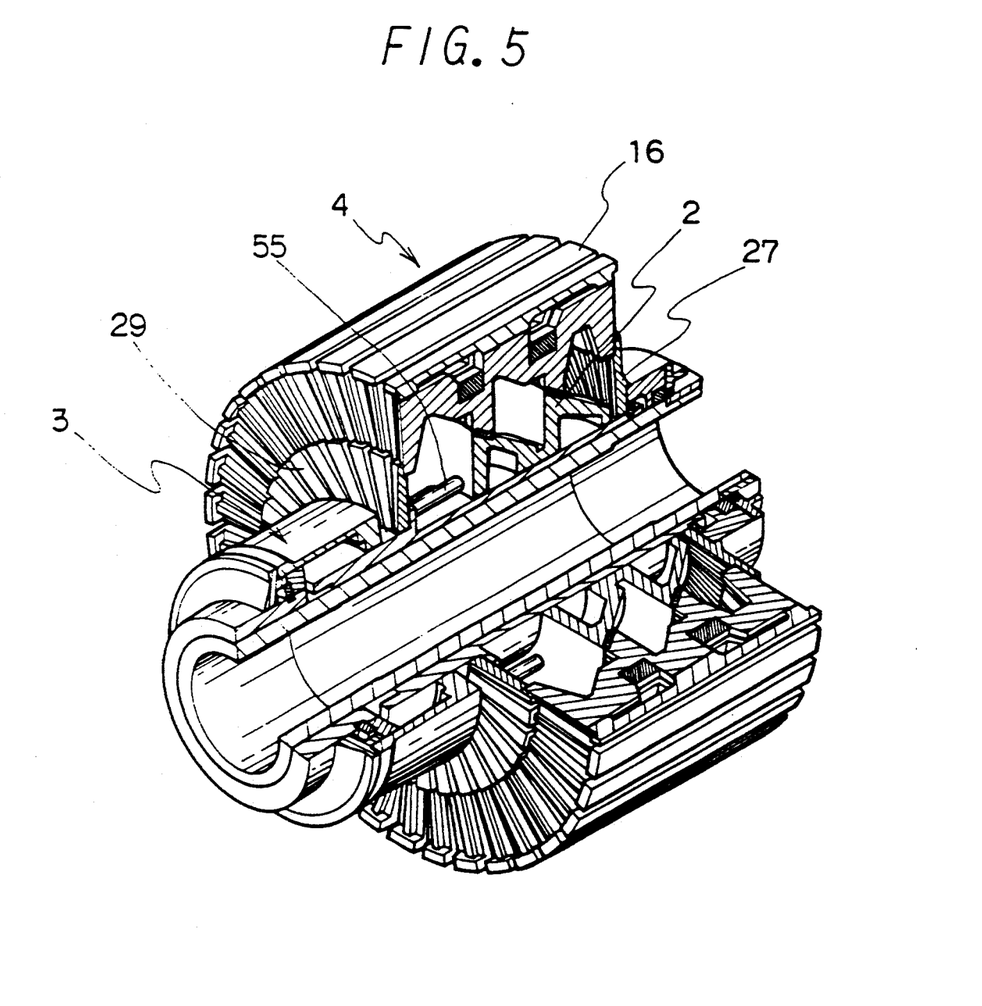
FIG. 5 is a partially cutaway perspective view showing the drum expanded.

In the drum for assembling a tire component material having the above-mentioned construction, when the cylinder tube 32 is positioned at the rearmost position (the condition shown in FIG. 1), the sliding body 2 is at the rearmost position. In this condition, the tapered internal surface portions 22 of each segment 16 are on the frontmost regions 5a of the tapered surfaces 5 and therefore the cylindrical aggregate 4 is in the smaller diameter condition (the condition shown in FIG. 1 and FIG. 3). Starting from this shrinked condition, when the cylinder tube 32 is slid towards the forward direction shown by the arrow X in FIG. 2 (namely, the direction toward the front end), the sliding body 2 in turn moves towards the front end and consequently the tapered internal surface portions 22 of each segment 16 slide along the tapered surfaces 5 and climb up the ramps and reach the rearmost portions 5b of the tapered surfaces 5. As a result, each segment 16 moves in the direction shown by the arrow Y in FIG. 2 (radial direction), and the cylindrical aggregate 4 reaches the expanded condition (condition shown in FIG. 2, FIG. 4 and FIG. 5). In this expanded condition, the stop (spacer) 50, having a predetermined width W, contacts both the attaching part 29 and the front wall 49a of the container chamber 49, so that the movement of the sliding body 2 in the direction shown by the arrow X in FIG. 2 is restricted by the distance W. Consequently, the expansion of each segment 16 is set and limited.

In use of the drum when in the expanded condition (shown in FIG. 2, FIG. 4 and FIG. 5), one or more tire breakers 51 are applied to the outside circumferential surface of the cylindrical aggregate 4 and subsequently, a tread 52 is applied thereon so that a ring-shaped assembly of the breaker with the tread is formed. Nylon bands or cap plies may be applied before the tread 52 is applied as the occasion demands. Then this assembly is taken into a transfer ring 53 of known construction and transferred to a shaping drum. In this transferring operation, the cylindrical aggregate 4 is brought into the minimum diameter condition. In order to make this change from the expanded condition shown in FIG. 2 to the minimum diameter condition, the cylinder tube 32 is slid in the converse direction (toward the rear wall) opposite to the direction shown by the arrow X in FIG. 2, so that the sliding body 2 is moved toward the rear side. Because the segments 16 are retracted inwardly by the elastic restoring rubber bands 24, the segments 16 move inwardly in the radial direction, with the tapered internal surface portions 22 thereof sliding down the tapered surface 5. By this retraction of segments 16, a ring shaped assembly of breaker and tread is readily held by the transfer ring from outside and easily removed from the belt drum.

The present invention is not limited to the above-mentioned embodiment and the design can be changed as long as the resultant apparatus does not deviate from the gist of the present invention. For example, it is a matter of course that the number of tapered surfaces 5 on the sliding body 2 is not limited to two but can be optionally more than two. Also, the inclination angle and the length of the tapered surface 5 can be varied optionally. With respect to the tapered internal surface portion 22, although the length thereof also can be selected optionally, the selection is made depending on the required displacement stroke of the segments 16 and the like. With respect to the stop (spacer) 50 the width W may be changed and the change allows control of the resultant maximum expanded outer diameter of the cylindrical aggregate 4.

The drum of the present invention employing the above-mentioned construction provides the following advantageous effects.

Each segments 16 is supported by the sliding body 2 at two or more regions, therefore each segment is accurately located and is not unstable so that the pressure receiving area of the sliding body 2 is large. As a result the strength of the belt drum assembly and total accuracy are significantly improved.

The outer diameter of the cylindrical aggregate 4 is increased and reduced by means of the cylinder mechanism 3 instead of by an electrically driven means, therefore the whole construction of the drum is simplified.

Further, the piston 12 and the cylinder tube 32 of the cylinder mechanism 3 are not contained inside the sliding body 2 and so the outer diameter of the sliding body 2 can be small thereby allowing a drum assembly for building of a breaker/tread assembly for a small size tire and the inner diameter of the sliding body 2 to be large. Thereby, the diameter of the shaft which the drum mounts on can be made large to enhance the mechanical accuracy and rigidity.

Furthermore, the maximum diameter of the cylindrical aggregate 4 is easily changed.

What is claimed is:

1. A drum for assembling tire components comprising a sliding body externally mounted on and engaged with a shaft for movement in an axial direction, and a cylindrical aggregate of a plurality of circumferentially spaced apart segments externally mounted on the sliding body by an expander means so that the outer diameter of said cylindrical aggregate of segments is expandable and reducible by means of the backward and forward movement in the axial direction of the sliding body by a cylinder mechanism, the cylindrical mechanism being provided adjacently outside said sliding body and radially outside the shaft.

2. The drum according to claim 1 wherein the expander means comprises at least one tapered surface on the outside of the sliding body and at least one co-operating internal tapered surface on each of said segments such that axial movement of the sliding body moves each of said segments radially outwards.

3. The drum according to claim 2 wherein two or more sets of internal tapered surface and co-operating tapered surface are provided.

4. The drum according to claim 2 or 3 wherein each segment has an outer plate-like segment and an internal member, said internal member being affixed to the plate-like segment and having formed thereon at least one circumferentially extending groove in which is located a circumferentially extending elastic ring to provide a radially inward force to move said segments inwards on return movement between each said internal tapered surface and each said cooperating tapered surface.

5. The drum according to any one of claim 1 to 3 further comprising a plurality of attaching parts, each of said plurality of attaching parts being disposed radially of the shaft and including guides for the radial movement and circumferential location of each of said segments.

6. The drum according to any one of claim 1 to 3 wherein the cylindrical mechanism is axially spaced along the shaft from the sliding body and comprises a ring shaped piston fixed to the shaft and a cylinder tube axially movable by means of fluid pressure.

7. The drum according to claim 6 further comprising a plurality of circumferentially spaced apart connecting members disposed between the cylinder tube and the sliding body.

8. The drum according to claim 7 further comprising a stop member provided on at least one of said connecting members to allow setting of the movement of the sliding body and resultant expansion of the drum.

* * * * *